(12) United States Patent
Miyakawa

(10) Patent No.: US 8,938,433 B2
(45) Date of Patent: Jan. 20, 2015

(54) INFORMATION MANAGEMENT APPARATUS, INFORMATION MANAGEMENT METHOD, AND INFORMATION CONTROL PROGRAM

(75) Inventor: Shinya Miyakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 59 days.

(21) Appl. No.: 13/387,890

(22) PCT Filed: Jul. 8, 2010

(86) PCT No.: PCT/JP2010/061592
§ 371 (c)(1),
(2), (4) Date: Jan. 30, 2012

(87) PCT Pub. No.: WO2011/013495
PCT Pub. Date: Feb. 3, 2011

(65) Prior Publication Data
US 2012/0131030 A1   May 24, 2012

(30) Foreign Application Priority Data

Jul. 31, 2009   (JP) ................................ 2009-180041

(51) Int. Cl.
*G06F 17/30*   (2006.01)
*G06F 21/62*   (2013.01)
*G06Q 10/00*   (2012.01)

(52) U.S. Cl.
CPC ...... *G06F 21/6227* (2013.01); *G06F 17/30979* (2013.01); *G06F 21/6254* (2013.01); *G06Q 10/00* (2013.01); *G06F 2221/2101* (2013.01); *G06F 2221/2117* (2013.01)
USPC .......................................... 707/705; 707/722

(58) Field of Classification Search
USPC ................................. 707/705, 722
See application file for complete search history.

(56) References Cited

U.S. PATENT DOCUMENTS 7,940,170 B2 *  5/2011  Tsau .......................... 340/539.13
2002/0188609 A1   12/2002  Fukuta et al.
(Continued)

FOREIGN PATENT DOCUMENTS

CN   101496026 A   7/2009
EP   0990972 A1   4/2000
(Continued)

OTHER PUBLICATIONS

Mori, et al.; "The report on the changes in the privacy of behavior and information abstraction technique in action Data Gathering Service",71st Annual Conference of Information Processing Society of Japan, Published Mar. 10, 2009, p. 3-345 to 3-346.
(Continued)

*Primary Examiner* — Hung Q Pham
(74) *Attorney, Agent, or Firm* — Sughrue Mion, PLLC

(57) ABSTRACT

An information management apparatus includes: a confidential data storing section configured to store a plurality of individual identifies (IDs) and data which is related to each of the plurality of individual IDs as confidential data. A receiving section is configured to receive a first search condition used to acquire desired confidential data to be transmitted from a first service providing unit. A searching section is configured to extract first candidate data which matches to the first search condition from the confidential data storing section. A transmission record storing section is configured to store a plurality of anonymized data which has been already transmitted to the first service providing unit. An anonymizing section is configured to generate first transmission data by carrying out processing to contain said first candidate data and the first data of the plurality of anonymized data based on first data which has data of a same kind as the first candidate data. A transmitting section is configured to transmit the first transmission data to the first service providing unit.

10 Claims, 14 Drawing Sheets

(56) References Cited

U.S. PATENT DOCUMENTS

2007/0263632 A1 11/2007 Sobue et al.
2009/0164566 A1* 6/2009 Kawai et al. .................. 709/203

FOREIGN PATENT DOCUMENTS

| | | | |
|---|---|---|---|
| EP | 2026239 A1 * | 2/2009 | |
| JP | 64-26272 A | 1/1989 | |
| JP | 11-143871 A | 5/1999 | |
| JP | 2002-312361 A | 10/2002 | |
| JP | 2004-318391 A | 11/2004 | |
| JP | 2006-268337 A | 10/2006 | |
| JP | 2007-219636 A | 8/2007 | |
| JP | 2007-264730 A | 10/2007 | |
| WO | 2007-136035 A1 | 11/2007 | |
| WO | 2008-108158 A1 | 9/2008 | |

OTHER PUBLICATIONS

Nishimura, et al.; "Privacy in information secure distribution platform Implementation of privacy information disclosure control", 71st Annual Conference of Information Processing Society of Japan, Published Mar. 10, 2009, p. 3-355 to 3-336.

Miyagawa, et al.; "Implementation of privacy information secure distribution platform which can perform control disclosure of privacy information users becomes led", 71st Annual Conference of Information Processing Society of Japan, Published Mar. 10, 2009, p. 3-333 to 3-334.

International Preliminary Report on Patentability issued Feb. 14, 2012, by The International Bureau of WIPO in counterpart International Application No. PCT/JP2010/061592.

Office Action, dated Jan. 13, 2014, issued by the State Intellectual Property Office of the People's Republic of China, in counterpart Application No. 201080034212.1.

Search Report dated May 12, 2014, issued by the European Patent Office, in counterpart Application No. 10804242.5.

Communication dated Jun. 24, 2014, issued by the Japanese Patent Office in counterpart Japanese application No. 2011-524724.

R. Watanabe et al., "A Proposal and Implementation of Secure ID management Scheme on Multi Domain Environment", The Institute of Electronics, Information and Communication Engineers, May 11, 2006, vol. 106, No. 41, pp. 9-12.

M. Imada et al., "A Detection Method of Privacy Violation on Social Networking Services", The Institute of Electronics, Information and Communication Engineers, Oct. 16, 2008, vol. 108, No. 258, pp. 71-76.

* cited by examiner

Fig. 12

| INDIVIDUAL ID | SERVICE INDIVIDUAL ID | |
|---|---|---|
| | SERVICE PROVIDING UNIT 10a | SERVICE PROVIDING UNIT 10B |
| INDIVIDUAL A | INDIVIDUAL $\alpha$ | INDIVIDUAL 1 |
| INDIVIDUAL B | INDIVIDUAL $\beta$ | INDIVIDUAL 2 |
| INDIVIDUAL C | INDIVIDUAL $\gamma$ | INDIVIDUAL 3 |
| INDIVIDUAL D | INDIVIDUAL $\delta$ | INDIVIDUAL 4 |

INFORMATION MANAGEMENT APPARATUS, INFORMATION MANAGEMENT METHOD, AND INFORMATION CONTROL PROGRAM

CROSS REFERENCE TO RELATED APPLICATIONS

This application is a National Stage Of International Application No. PCT/JP2010/061592 filed on Jul. 8, 2010, which claims priority from Japanese Patent Application No. 2009-180041, filed on Jul. 31, 2009, the contents of all of which are incorporated herein by reference in their entirety.

TECHNICAL FIELD

The present invention is related to an information management apparatus, an information management method and an information management program which manages confidential data.

BACKGROUND ART

In recent years, many techniques for distributing privacy information safely are proposed. For example, as the techniques of this kind, the techniques described in Patent Literatures 1 to 3 are exemplified.

In Patent Literature 1, a data disclosure apparatus is proposed which can provide privacy data of a person while preventing the person from being inferred, in a method of providing privacy data. This data disclosure apparatus is provided with a retaining section of retaining one or more of data, each of which has one or more attributes. An anonymity calculating section calculates anonymity when a specific attribute of the data is disclosed. A grading change disclosure section changes the grading of data of the specific attribute, when the calculated anonymity does not have desired anonymity, and discloses the data of the attribute which meets anonymity above a desired threshold. Such a data disclosure apparatus can discloses individual data which cannot be disclosed because the anonymity securing is difficult, by making a description grading rough.

An information mediating system is disclosed in Patent Literature 2 which discloses privacy data outside safely. The information mediating system has a user terminal, an information provider terminal and a mediating server. The mediating server is provided with a section of collecting and storing provision data from the information provider terminal, a section of accumulating attribute data of the information provider, and a section of retaining a disclosure condition of a combination of each item of the provision data and each item of attribute data. The mediating server can disclose the combination according to the disclosure condition, and provides data by rewriting data for collecting the provision data and the attribute data for every name with dummy data, when the disclosure of the combination is not permitted. Such an information mediating system can change a method of data disclosure by defining a disclosure range of the provision data to a user in detail.

In Patent Literature 3, a member data management center apparatus is disclosed, in which an adequate service is provided to each of members while protecting the privacy of the member. This member data management center apparatus is provided with a plurality of individual member information databases for managing individual member data related to an individual member IDs, and a secondary member data database for managing secondary member data related to a secondary member ID. The member data management center apparatus receives correspondence relation between the individual member ID and the secondary member ID from a member service providing apparatus, in which the individual member ID and the secondary member ID are related, groups the member data for every name, and generates abstracted individual member data by carrying out processing to prevent the member from being inferred uniquely. Moreover, the member data management center apparatus generates and stores name-based grouping member data which contains the secondary member ID and the abstracted individual member data in the secondary member data database, and discards the correspondence relation between the secondary member ID and the individual member ID. In such a member data management center apparatus, the grasping of detailed member data every member is difficult even if the member data is exposed just as it is, and the privacy of the member can be kept in a constant level.

CITATION LIST

[Patent Literature 1]: JP 2007-219636A
[Patent Literature 2]: JP 2007-264730A
[Patent Literature 3]: JP 2006-268337A

SUMMARY OF THE INVENTION

In the technique according to Patent Literature 1, processing of abstraction, subdivision, anonymizing, and so on is performed under the presupposition that all data in a permitted range are viewed, even if a user viewed only a part of the data. As a result, in Patent Literature 1, there is a problem that the precision of the data is reduced.

In the technique according to Patent Literature 2, there is a problem that the user needs to recognize that the dummy data is contained in the data and it is excluded for analysis.

In the technique according to Patent Literature 3, there is a problem that an individual member can be specified by grouping the data every user, when providing the secondary member data which is subjected to the abstraction processing which is different every user.

An object of the present invention is to provide an information management apparatus which can provide confidential data which satisfies anonymity in a range of actual use.

The information management apparatus of the present invention includes: a confidential data storing section configured to store as confidential data, a plurality of individual identifies (IDs) and data which is related to each of the plurality of individual IDs; a receiving section configured to receive a first search condition used to acquire desired confidential data and transmitted from a first service providing unit; a searching section configured to extract first candidate data which matches to the first search condition, from the confidential data storing section; a transmission record storing section configured to store a plurality of anonymized data which have been already transmitted to the first service providing unit; an anonymizing section configured to generate first transmission data by carrying out processing to contain the first candidate data and the first data of the plurality of anonymized data based on first data which has data of a same kind as the first candidate data; and a transmitting section configured to transmit the first transmission data to the first service providing unit.

The information management method of the present invention includes: a step of receiving a first search condition used to acquire desired confidential data transmitted from a first service providing unit; a step of extracting first candidate data which matches to the first search condition from a confidential data storing section which stores a plurality of individual IDs and data which is related to each of the plurality of individual IDs as confidential data; a step of generating first transmission data by carrying out processing to contain the first candidate data and first data, of a plurality of anonymized data which have been already transmitted to the first service providing unit, based on the first data which has data of a same kind as the first candidate data; and a step of transmitting the first transmission data to the first service providing unit.

The computer-executable information management program of the present invention includes a step of receiving a first search condition used to acquire desired confidential data transmitted from a first service providing unit; a step of extracting first candidate data which matches to the first search condition from a confidential data storing section which stores a plurality of individual IDs and data which is related to each of the plurality of individual IDs, as confidential data; a step of generating first transmission data by carrying out processing to contain the first candidate data and first data, of a plurality of anonymized data which have been already transmitted to the first service providing unit, based on the first data which has data of a same kind as the first candidate data; and a step of transmitting the first transmission data to the first service providing unit.

The information management apparatus of the present invention can provide the confidential data which satisfies anonymity in a range of actual use.

BRIEF DESCRIPTION OF THE DRAWINGS

The objects, effects, features of the above invention would become clear from the embodiments in conjunction with the attached drawings:

FIG. 12 is a table showing the individual ID and a service individual ID corresponding to the individual ID stored in an ID correspondence storing section 110;

DESCRIPTION OF EXEMPLARY EMBODIMENTS

Hereinafter, an information management apparatus, an information management method and an information management program according to embodiments of the present invention will be described with reference to the attached drawings.

[First Exemplary Embodiment]

Figure 1:
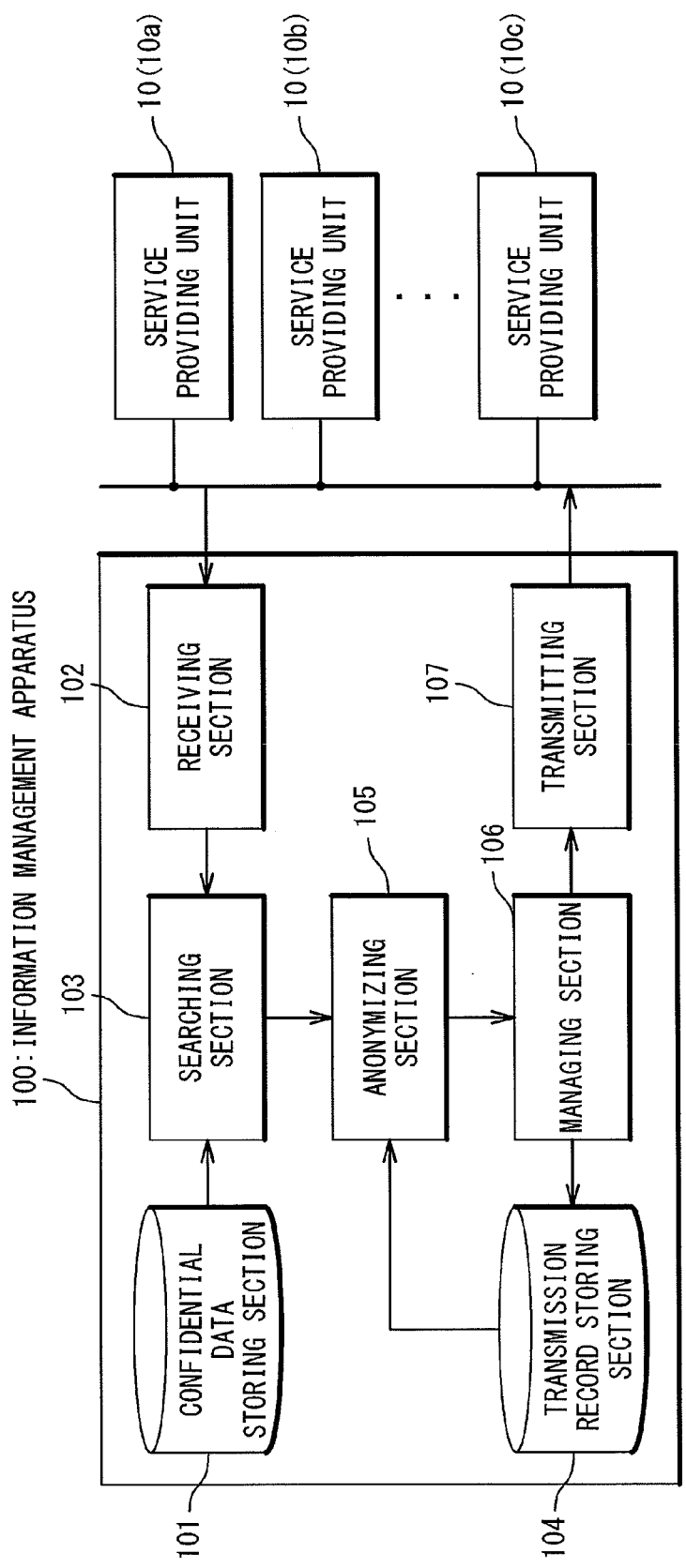
FIG. 1 is a functional block diagram showing a configuration of an information management apparatus 100 according to a first exemplary embodiment of the present invention.

A first exemplary embodiment of the present invention will be described. FIG. 1 is a functional block diagram showing a configuration of an information management apparatus 100 according to the first exemplary embodiment of the present invention. The information management apparatus 100 of the present invention is connected with a plurality of service providing units 10 (10a, 10b, and 10c) through data transmission paths of a network. The plurality of the service providing units 10 are operated by various service providers. The information management apparatus 100 of the present invention can anonymize the stored confidential data and transmit to each of the service providing units 10. Referring to FIG. 1, the information management apparatus 100 is provided with a confidential data storing section 101, a receiving section 102, a searching section 103, a transmission record storing section 104, an anonymizing section 105, a managing section 106, and a transmitting section 107.

The confidential data storing section 101 stores a plurality of individual data as confidential data. In detail, the confidential data storing section 101 stores a plurality of individual IDs and data (individual data) which are related to the plurality of individual IDs as the confidential data. The individual ID is an ID which identifies a person such as an owner, a transmitter, a manager of the data. The data which is related to each of the plurality of individual IDs contains at least one of data which specifies a person such as a name and an address, data such as action data, and data such as purchase data and data which makes the characteristic of the person clear, and data related to infringement of privacy. It should be noted that the format of the individual ID is sufficient if the information management apparatus 100 can identify uniquely, and may be a form like UUID (Universally Unique Identifier) or a form like URI (Uniform Resource Identifier) which is used in OpenID and XRI
(Extensible Resource Identifier).

The receiving section 102 receives a search request transmitted from the service providing unit 10 so as to acquire desired confidential data. The search request contains a search condition such as a person name, a data kind, and a period when the data are effective, and a service ID used to identify the service providing unit 10 or a service provider. The receiving section 102 supplies the received search request to the searching section 103.

The searching section 103 extracts the search condition from the received search request. The searching section 103 extracts the plurality of data (candidate data) which match to the search condition from the confidential data which are stored in the confidential data storing section 101. The candidate data contains an individual ID and the plurality of data which are related to the individual ID. The searching section 103 supplies the plurality of candidate data and the service ID which is contained in the search request to the anonymizing section 105.

The transmission record storing section 104 stores a transmission record. The transmission record is obtained by relating the plurality of anonymized data (transmission data) which have been already transmitted to each of the service providing units 10, and the service ID used to identify the service providing unit 10 as a transmission destination of the transmission data. The anonymized data (the transmission data) contains a plurality of individual IDs and the plurality of processed data. The processed data shows a data which has been processed (anonymized) to contain at least two of the data which are related to the plurality of individual IDs such that a person corresponding to each of the individual IDs in the confidential data storing section 101 is not specified. It should be noted that the anonymizing section 105 to be mentioned later anonymizes the confidential data and the transmitting section 107 to be mentioned later transmits the transmission data. The format of the service ID is sufficient if the information management apparatus 100 can identify uniquely and if the transmission data can be transmitted to the service providing unit 10, and it may be a general form like URL (Uniform Resource Locator) and URI.

The anonymizing section 105 receives the plurality of candidate data and the service ID from the searching section 103. The anonymizing section 105 refers to the transmission record (sets of the service ID and the transmission data) in the transmission record storing section 104, and extracts the plurality of transmission data which are related to the same service ID as the received service ID. Next, the anonymizing section 105 merges the plurality of candidate data and the plurality of extracted transmission data to generate temporary transmission data. The anonymizing section 105 carries out processing (anonymization) such as abstraction, obscuring, and partial deletion to the plurality of candidate data by using the plurality of transmission data, such that the temporary transmission data satisfies anonymity. In other words, the anonymizing section 105 carries out the processing to contain at least one candidate data and at least one transmission data which has data of the same kind as the candidate data. At the time when the temporary transmission data satisfies anonymity, the anonymizing section 105 supplies the anonymized temporary transmission data together with the service ID to the managing section 106 as new transmission data. It should be noted that when any transmission data is not stored in the transmission record storing section 104, the anonymizing section 105 can carry out the processing to contain at least two candidate data which have data of the same kind, by using the plurality of candidate data, and to generate the new transmission data.

The managing section 106 receives the service ID and the new transmission data from the anonymizing section 105. The managing section 106 supplies the new transmission data transmitted to the service providing unit 10, to the transmission record storing section 104 together with the service ID. Moreover, the managing section 106 supplies the service ID and the new transmission data to the transmitting section 107. It should be noted that the transmission record storing section 104 relates the new transmission data to the service ID and stores it in the transmission record.

The transmitting section 107 receives the service ID and the new transmission data. The transmitting section 107 transmits the new transmission data to the service providing unit 10 based on the service ID.

Figure 2:
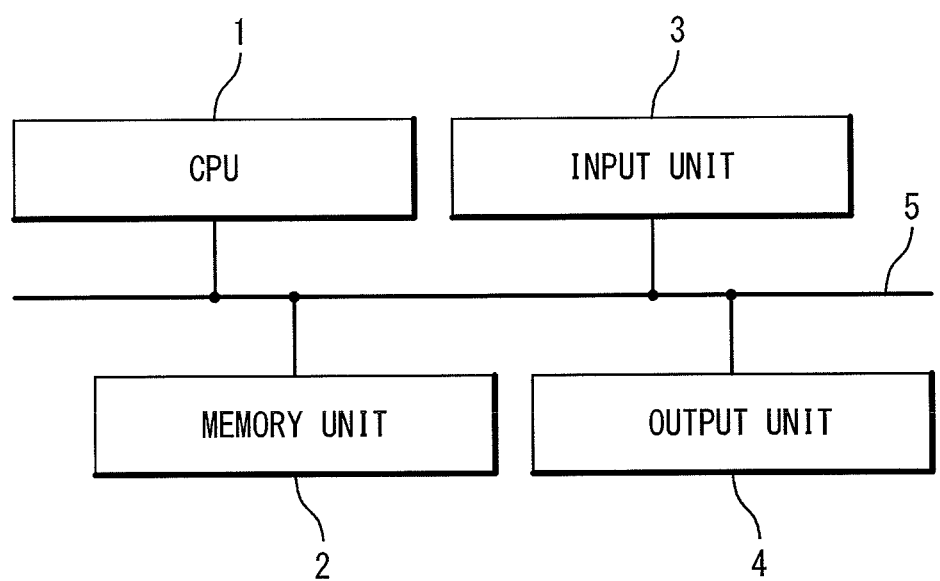
FIG. 2 is a block diagram showing a hardware configuration example of the information management apparatus 100 in the first exemplary embodiment.

The information management apparatus 100 according to the embodiment of the present invention is feasible by using the computer. FIG. 2 is a block diagram showing a hardware configuration example of the embodiment of the information management apparatus 100. Referring to FIG. 2, the information management apparatus 100 of the present invention is configured from a computer system which is provided with a CPU (Central Processing Unit) 1, a memory unit 2, an input unit 3, an output unit 4 and a bus 5 which connects the units.

The CPU 1 carries out calculation processing and control processing in the information management apparatus 100 of the present invention based on a program which is stored in the memory unit 2. The memory unit 2 is a unit for storing data, such as a hard disk and a memory. The memory unit 2 stores a program which is read from a computer-readable storage medium such as CD-ROM and DVD, a signal and a program which is inputted from the input unit 3, and the processing result of the CPU 1. The input unit 3 is a unit such as a mouse, a keyboard, and a microphone which the user can input a command and a signal to. The output unit 4 is a unit such as s display and a speaker which notifies an output to a user. It should be noted that the present invention is not limited to the hardware configuration example and the shown one and each section can be realized in hardware or software or a combination of them.

Figure 3:
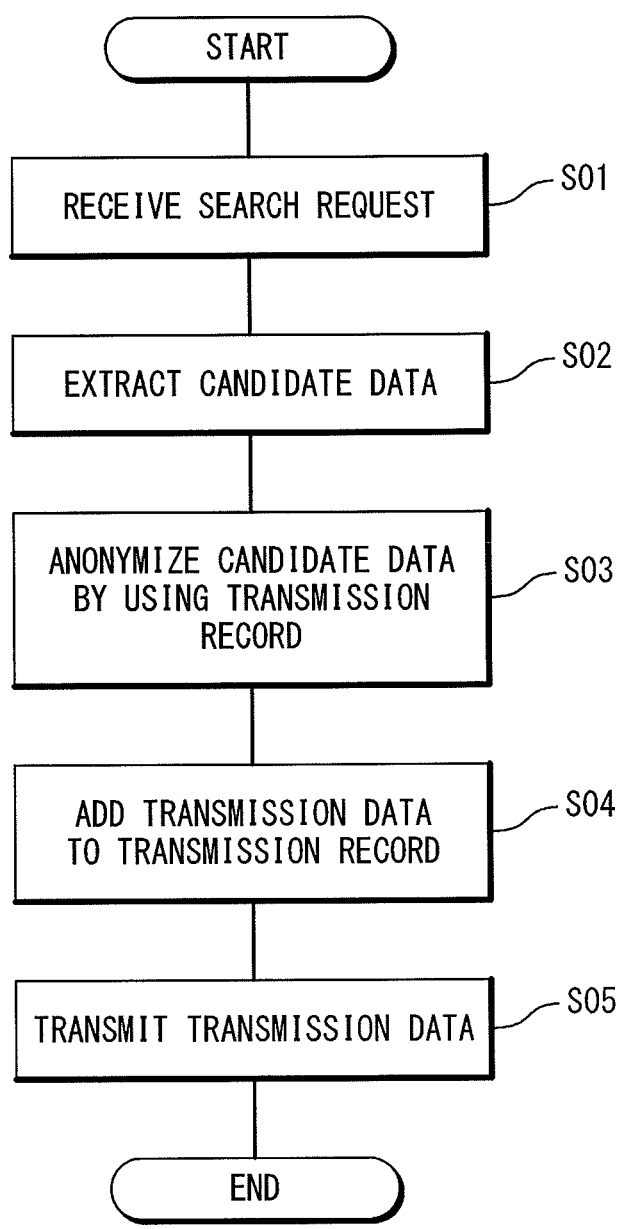
FIG. 3 is a flow chart showing a processing operation of the information management apparatus 100 according to the first exemplary embodiment of the present invention.

FIG. 3 is a flow chart showing a processing operation of the information management apparatus 100 according to the first exemplary embodiment of the present invention. Referring to FIG. 3, the processing operation according to the first exemplary embodiment of the present invention will be described.
Step S01:
The receiving section 102 receives a search request from the service providing units 10. The search request contains a search condition such as a name of a person, a kind of data, and a period when the data is generated and effective, and a service ID used to identify the service providing unit 10 or a service provider. The receiving section 102 supplies the received search request to the searching section 103.
Step S02:
The searching section 103 extracts the search condition from the received search request. The searching section 103 extracts a plurality of data (candidate data) which match to the search condition, from among the confidential data which are stored in the confidential data storing section 101. The candidate data contains an individual ID and the plurality of data which are related to the individual ID. The searching section 103 supplies the plurality of candidate data and the service ID which is contained in the search request to the anonymizing section 105.
Step S03:
The anonymizing section 105 receives the plurality of candidate data and the service ID from the searching section 103. The anonymizing section 105 anonymizes the plurality of candidate data by using the transmission record. In detail, the anonymizing section 105 refers to the transmission record (sets of the service ID and the transmission data) in the transmission record storing section 104 to extract the plurality of transmission data which are related to the same service ID as the received service ID. Next, the anonymizing section 105 merges the plurality of candidate data and the plurality of the extracted transmission data and generates temporary transmission data. The anonymizing section 105 carries out processing (anonymizing) such as abstraction, obscuring, and part deletion to the plurality of candidate data, by using the plurality of transmission data, such that the temporary transmission data satisfies anonymity. In other words, the anonymizing section 105 carries out the processing to contain at least one candidate data and at least one transmission data which has data of the same kind as the candidate data. The anonymizing section 105 supplies the anonymized temporary transmission data to the managing section 106 together with the service ID as the new transmission data, when the temporary transmission data satisfies the anonymity. It should be noted that when the transmission data has not been stored in the transmission record storing section 104, the anonymizing section 105 carries out the processing to have at least two data of the same kind by using the plurality of candidate data, to generate the new transmission data.

Step S04:

The managing section 106 receives the service ID and the new transmission data from the anonymizing section 105. The managing section 106 supplies the new transmission data which are transmitted to the service providing units 10 to the transmission record storing section 104 together with the service ID. Moreover, the managing section 106 supplies the service ID and the new transmission data to the transmitting section 107. The transmission record storing section 104 relates the new transmission data to the service ID and stores them in the transmission record.

Step S05:

The transmitting section 107 receives the service ID and the new transmission data. The transmitting section 107 transmits the new transmission data to the service providing unit 10 based on the service ID.

As described above, the information management apparatus 100 according to the first exemplary embodiment of the present invention can anonymize and supplies the confidential data requested from the service providing unit 10 together with the transmission data transmitted to the service providing unit 10 in the past. Even when the precision of the data falls too much if anonymizing the whole confidential data, the reduction of data precision can be suppressed to the minimum if the confidential data requested from the service providing unit 10 is a part of the confidential data. In this way, the information management apparatus 100 according to the first exemplary embodiment of the present invention attains the effect that the precision of the data can be improved in the process of securing the anonymity of the confidential data to be supplied to the service providing units 10.

[Second Exemplary Embodiment]

The second exemplary embodiment of the present invention will be described. The information management apparatus 200 according to the second exemplary embodiment of the present invention is different from the information management apparatus 100 according to the first exemplary embodiment in that the individual ID contained in the confidential data is converted for every service providing unit 10 and supplied.

Figure 4:
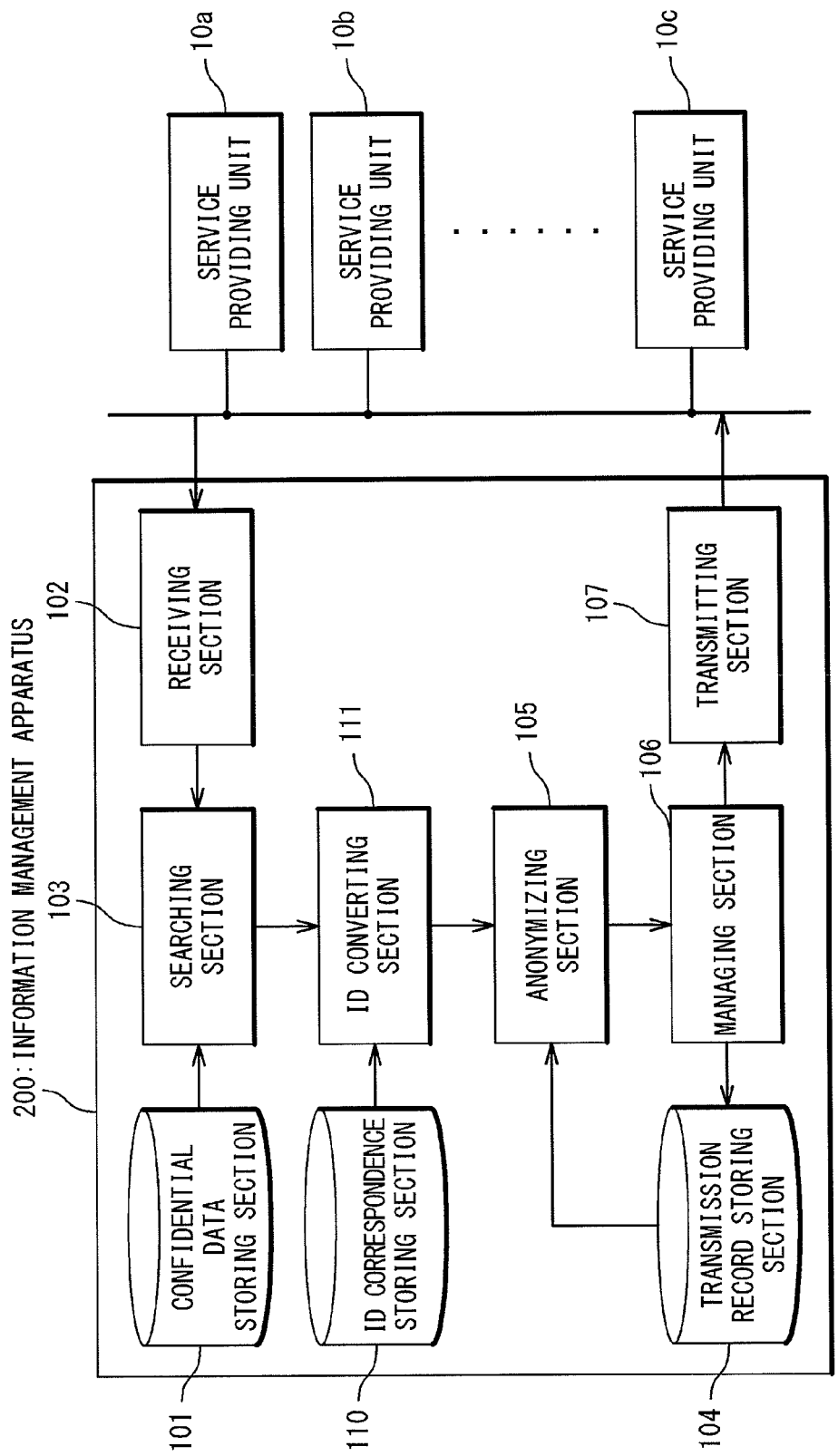
FIG. 4 is a functional block diagram showing the configuration of an information management apparatus 200 according to a second exemplary embodiment of the present invention.

FIG. 4 is a functional block diagram showing the configuration of the information management apparatus 200 according to a second exemplary embodiment of the present invention. Referring to FIG. 4, the information management apparatus 200 according to the second exemplary embodiment of the present invention is provided with the confidential data storing section 101, the receiving section 102, the searching section 103, the transmission record storing section 104, the anonymizing section 105, the managing section 106, the transmitting section 107, an ID correspondence storing section 110, and an ID converting section 111. Because the confidential data storing section 101, the receiving section 102, the searching section 103, the transmission record storing section 104, the anonymizing section 105, the managing section 106, and the transmitting section 107 are same as those of the first exemplary embodiment, the description is omitted.

The ID correspondence storing section 110 stores sets of the plurality of individual ID and a plurality of service individual IDs which are different for every service providing unit 10.

The ID converting section 111 receives the plurality of candidate data and the service ID from the searching section 103. The ID converting section 111 reads the individual ID which is contained in each of the plurality of candidate data. The ID converting section 111 refers to ID correspondence storing section 110 and extracts the service individual ID corresponding to the received service ID and the read individual ID. The ID converting section 111 replaces the individual ID contained in each of the plurality of candidate data with the extracted service individual ID. The ID converting section 111 supplies the service ID and the plurality of candidate data, each of which contains the service individual ID, to the anonymizing section 105.

Figure 5:
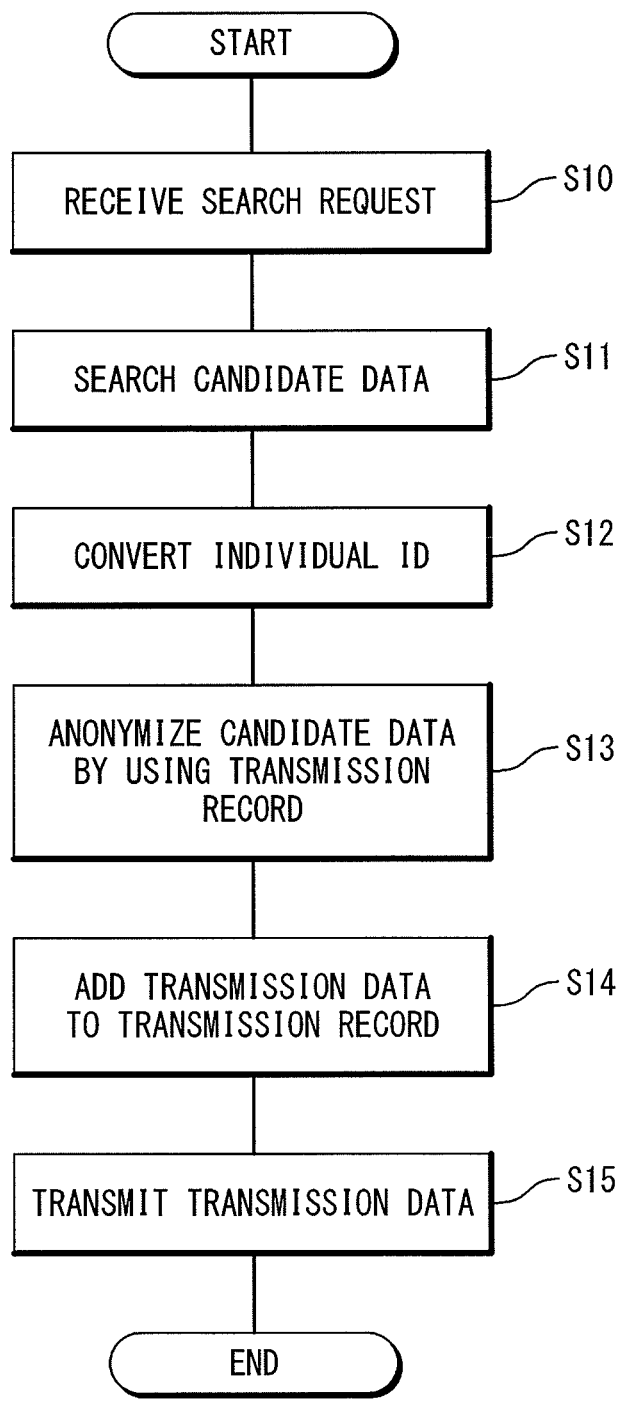
FIG. 5 is a flow chart showing a processing operation of the information management apparatus 200 according to the second exemplary embodiment of the present invention.

FIG. 5 is a flow chart showing a processing operation of the information management apparatus 200 according to the second exemplary embodiment of the present invention. Referring to FIG. 5, the processing operation according to the second exemplary embodiment of the present invention will be described.

Step S10:

The receiving section 102 receives the search request from the service providing unit 10. The search request contains the search condition such as a name of a person, a kind of data, and a period in which the data is generated and effective, and the service ID used to identify the service providing unit 10 or the service provider. The receiving section 102 supplies the received search request to the searching section 103.

Step S11:

The searching section 103 extracts the search condition from the received search request. The searching section 103 extracts the plurality of data (the candidate data) which match to the search condition from among the confidential data which have been stored in the confidential data storing section 101. The candidate data contains the individual ID and the plurality of data which are related to the individual ID. The searching section 103 supplies the plurality of candidate data and the service ID which is contained in the search request, to the ID converting section 111.

Step S12:

The ID converting section 111 receives the plurality of candidate data and the service ID from the searching section 103. The ID converting section 111 reads the individual ID which is contained in each of the plurality of candidate data. The ID converting section 111 refers to the ID correspondence storing section 110 and extracts the service individual ID corresponding to the received service ID and the read individual ID. The ID converting section 111 replaces the individual ID which is contained in each of the plurality of candidate data with the extracted service individual ID. The ID converting section 111 supplies the service ID and the plurality of candidate data, each of which contains the service individual ID, to the anonymizing section 105.

Step S13:

The anonymizing section 105 receives the plurality of candidate data and the service ID from the ID converting section 111. The anonymizing section 105 anonymizes the plurality of candidate data by using the transmission record. The details of the anonymizing are same as in the first exemplary embodiment.

Step S14:

The managing section 106 receives the service ID and the new transmission data from the anonymizing section 105. The managing section 106 supplies the new transmission data which is transmitted to the service providing units 10, to the transmission record storing section 104 together with the service ID. Moreover, the managing section 106 supplies the service ID and the new transmission data to the transmitting section 107. The transmission record storing section 104 relates the new transmission data to the service ID and stores them in the transmission record.

Step S15:

The transmitting section 107 receives the service ID and the new transmission data. The transmitting section 107 transmits the new transmission data to the service providing units 10 based on the service ID.

As described above, when the kinds of the confidential data requested from each of the service providing units 10 are different, the information management apparatus 200 according to the second exemplary embodiment of the present invention can provide the anonymized confidential data which contains the service individual ID which is different every service providing unit 10. Thus, the information management apparatus 200 attains the effect that it is possible to prevent data from being collected for every person through collusion of the plurality of service providing units 10. In other words, even if the plurality of service providing units 10 collude, there is not a fear for a person to be specified, because each service providing unit 10 cannot determine that the supplied confidential data is a data of the same person. Therefore, the information management apparatus 200 according to the second exemplary embodiment of the present invention can supplies those confidential data to the different service providing units 10, even if the person is specified by combining a plurality of kinds of anonymized confidential data.

[Third Exemplary Embodiment]

A third exemplary embodiment of the present invention will be described. The information management apparatus 300 according to a third exemplary embodiment of the present invention is different from the information management apparatus 100 according to the first exemplary embodiment in that data which has not been transmitted to the service providing unit 10 because of non-satisfying anonymity is used for processing of the anonymity of the subsequent search requests.

Figure 6:
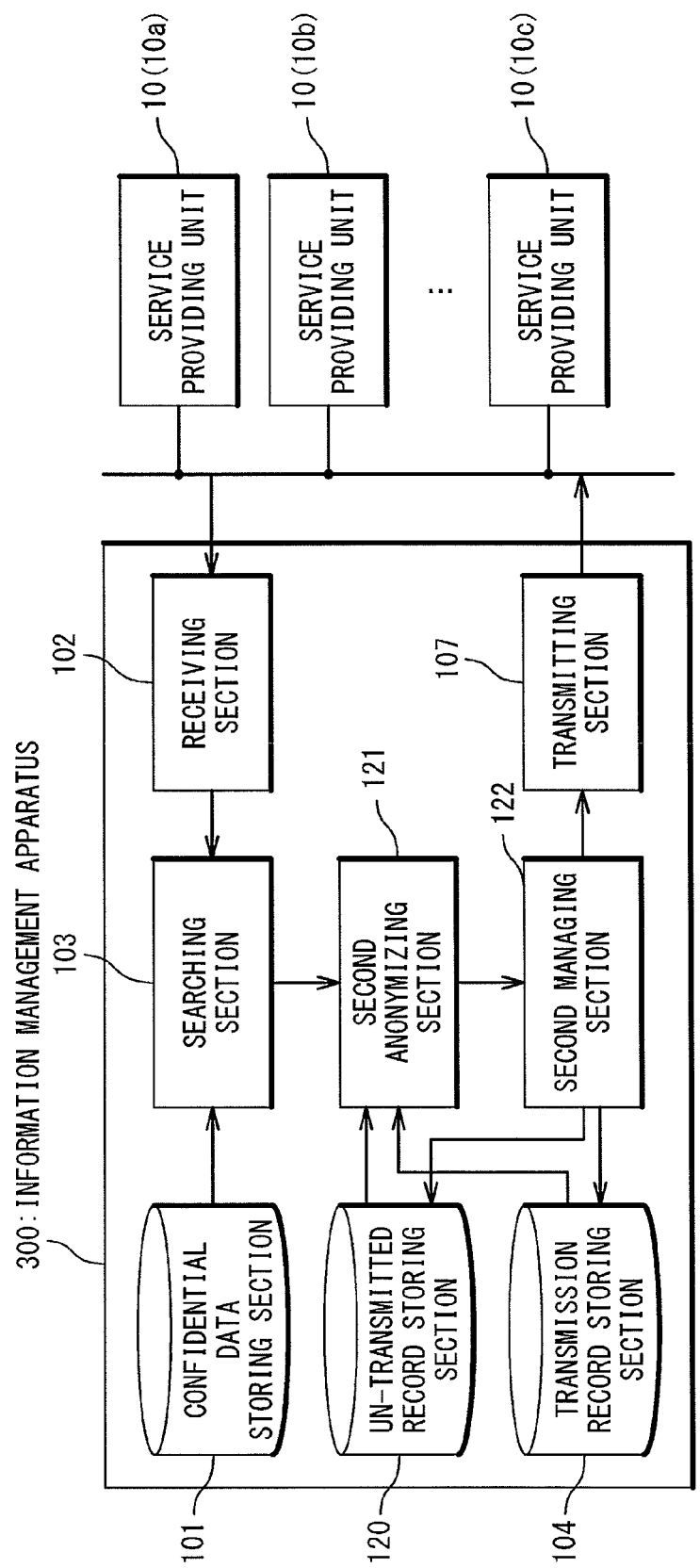
FIG. 6 is a functional block diagram showing the configuration of an information management apparatus 300 according to a third exemplary embodiment of the present invention.

FIG. 6 is a functional block diagram showing the configuration of the information management apparatus 300 according to the third exemplary embodiment of the present invention. Referring to FIG. 6, the information management apparatus 300 according to the third exemplary embodiment of the present invention is provided with the confidential data storing section 101, the receiving section 102, the searching section 103, the transmission record storing section 104, the transmitting section 107, an un-transmitted record storing section 120, a second anonymizing section 121, and a second managing section 122. Because the confidential data storing section 101, the receiving section 102, the searching section 103, the transmission record storing section 104, and the transmitting section 107 are same as those of the first and second exemplary embodiments, the description thereof is omitted.

The un-transmitted record storing section 120 stores an un-transmitted record. The un-transmitted record is obtained by relating the plurality of data (un-transmitted data) which have not been transmitted to the service providing units 10 because they do not satisfy anonymity (because it cannot be anonymized) and the service ID of the transmission destination of each un-transmitted data. The un-transmitted data is obtained by relating the individual ID and the plurality of data, which cannot be anonymized, of the plurality of data which are related to the individual ID which is contained in the candidate data.

The second anonymizing section 121 receives the plurality of candidate data and the service ID from the searching section 103. The second anonymizing section 121 refers to the transmission record (sets of the service ID and the transmission data) of the transmission record storing section 104, and extracts the plurality of transmission data which are related to the same service ID as the received service ID. Moreover, the second anonymizing section 121 refers to the un-transmitted record (sets of the service ID and the un-transmitted data) of the un-transmitted record storing section 120, and extracts the plurality of un-transmitted data which are related to the same service ID as the received service ID. Next, the second anonymizing section 121 merges the plurality of candidate data, the plurality of extracted transmission data and the plurality of extracted un-transmitted data, and generates temporary transmission data. The second anonymizing section 121 carries out processing (anonymization) such as the abstraction, obscuring, and partial deletion to the plurality of candidate data by using the plurality of transmission data and the plurality of un-transmitted data for the temporary transmission data so as to satisfy anonymity. In other words, the second anonymizing section 121 carries out the processing to contain at least one candidate data and at least one un-transmitted data which has data of the same kind as the candidate data or at least one transmission data. At this time, the second anonymizing section 121 determines as the un-transmitted data which cannot be anonymized, data of a kind neither contained in the un-transmitted data or the transmission data, among the plurality of data which is related to the individual ID which is contained in the candidate data. The second anonymizing section 121 sets the anonymized temporary transmission data as new transmission data and divides the data which cannot be anonymized, among the plurality of candidate data as new un-transmitted data. The second anonymizing section 121 supplies the anonymized temporary transmission data together with the service ID to the second managing section 122 as the new transmission data, and supplies the data which cannot be anonymized, among the plurality of candidate data to the second managing section 122 together with the service ID as the new un-transmitted data.

The second managing section 122 supplies the new transmission data and the service ID to the transmission record storing section 104, and supplies the new un-transmitted data and the service ID to the un-transmitted record storing section 120.

Figure 7:
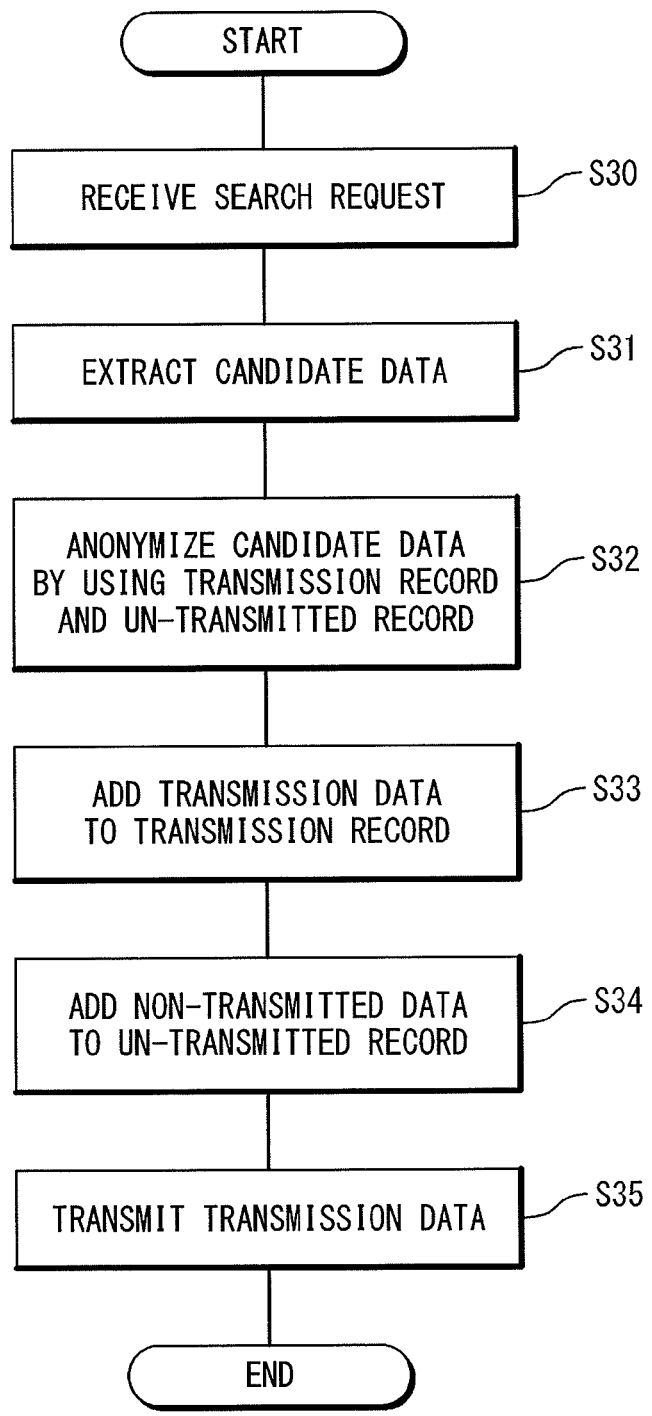
FIG. 7 is a flow chart showing a processing operation of the information management apparatus 300 according to the third exemplary embodiment of the present invention.

FIG. 7 is a flow chart showing the processing operation of the data management apparatus 300 according to the third exemplary embodiment of the present invention. Referring to FIG. 7, the processing operation of the third exemplary embodiment of the present invention will be described.

Step S30:

The receiving section 102 receives a search request from any of the service providing units 10. The search request contains a search condition such as a person name, a data kind and a period in which the data is generated, and the service ID used to identify the service providing unit 10 or a service provider. The receiving section 102 supplies the received search request to the searching section 103.

Step S31:

The searching section 103 extracts the search condition from the received search request. The searching section 103 extracts the plurality of data (candidate data) which match to the search condition, from among the confidential data stored in the confidential data storing section 101. The candidate data contains an individual ID and the plurality of data which are related to the individual ID. The searching section 103 supplies the plurality of candidate data and the service ID which are contained in the search request to the second anonymizing section 121.

Step S32:

The second anonymizing section 121 receives the plurality of candidate data and the service ID from the searching section 103. The second anonymizing section 121 refers to the transmission record (sets of the service ID and the transmission data) in the transmission record storing section 104, and extracts the plurality of transmission data which are related to the same service ID as the received service ID. Moreover, the second anonymizing section 121 refers to the un-transmitted record (sets of the service ID and the un-transmitted data) in the un-transmitted record storing section 120, and extracts the plurality of un-transmitted data which are related to the same service ID as the received service ID. Next, the second anonymizing section 121 merges the plurality of candidate data, a plurality of the extracted transmission data and a plurality of the extracted un-transmitted data, and generates temporary transmission data. The second anonymizing section 121 carries out processing (anonymization) such as abstraction, obscuring, and partial deletion to the plurality of candidate data by using the plurality of transmission data and the plurality of un-transmitted data, such that the temporary transmission data satisfies anonymity. In other words, the second anonymizing section 121 carries out the processing to contain at least one candidate data and at least one un-transmitted data which has data of the same kind as the candidate data or at least one transmission data. At this time, the second anonymizing section 121 determines as the un-transmitted data which cannot be anonymized, data of a kind neither contained in the un-transmitted data or the transmission data, among the plurality of data which are related to the individual ID which is contained in the candidate data. The second anonymizing section 121 sets the anonymized temporary transmission data as the new transmission data and separates the data which cannot be anonymized, of the plurality of candidate data as new the un-transmitted data. The second anonymizing section 121 supplies the anonymized temporary transmission data together with the service ID to the second managing section 122 as the new transmission data, and supplies the data which cannot be anonymized, of the plurality of candidate data, together with the service ID to the second managing section 122 as the new un-transmitted data.

Step S33 and Step S34:

The second managing section 122 receives the service ID, the new transmission data and the new un-transmitted data from the second anonymizing section 121. The second managing section 122 supplies the service ID and the new transmission data to the transmission record storing section 104, and supplies the service ID and the new un-transmitted data to the un-transmitted record storing section 120. Moreover, the second managing section 122 supplies the service ID and the new transmission data to the transmitting section 107. The transmission record storing section 104 relates the new transmission data to the service ID and stores them in the transmission record. Also, the un-transmitted record storing section 120 relates the new un-transmitted data to the service ID and stores them in the un-transmitted record.

Step S35:

The transmitting section 107 receives the service ID and the new transmission data from the managing section 106. The transmitting section 107 transmits the new transmission data to the service providing unit 10 based on the service ID.

As described above, the information management apparatus 300 according to the third exemplary embodiment of the present invention can use the data which has not been transmitted because it has been requested from the service providing unit 10 but does not satisfy the anonymity, for the processing of the anonymity of data to be transmitted later. For example, because the data can be anonymized by assuming a case where the data which has not been transmitted previously is transmitted, the data can be transmitted in a higher precision.

In the above, although the data management apparatus 100, 200, and 300 in the embodiments of the present invention have been described with reference to the drawings, these are examples of the present invention and various configurations except the above can be adopted. For example, the information management apparatus 100, 200, 300 in the embodiments may accumulate requests from the service providing units 10 previously, and then may collectively search the confidential data, anonymize it and return it to the service providing unit 10, in addition to synchronously returning the anonymized confidential data according to the request from the service providing unit 1. In this case, the information management apparatus 100, 200, and 300 may have a storing section (not shown) which can store the search requests. Also, when the number of search requests stored in the storing section from the identical service providing unit 10 reaches a predetermined number, the searching section 103 may take out one or more search requests from the storing section and search the confidential data which match to each search request. Moreover, the anonymizing section 105 and the second anonymizing section 121 may anonymize to all the confidential data, and collectively generate transmission data. According to this configuration, because more confidential data can be anonymized, the precision of the confidential data can be improved.

The anonymizing section 105 and the second anonymizing section 121 have been described about the configuration in which the confidential data is anonymized according to an optional method. However, the anonymizing method may be able to be selected. For example, as the anonymizing method, various types of processing may be carried out to lower the precision of the confidential data, to delete a part of the confidential data, to replace a part of the confidential data with dummy data, and to add miscellaneous data to the confidential data. That is, the search request from the service providing unit 10 may contain the search condition, the service ID and a policy for specifying the anonymizing method. In this case, instead of the anonymizing section 105 and the second anonymizing section 121, an anonymizing section may be provided which interprets the policy and anonymizes the confidential data by the specified method. According to this configuration, because the confidential data is supplied in a form easy to use to the service providing unit 10, the confidential data can be fully utilized.

It should be noted that even if the expression of the present invention is changed among a method, an apparatus, a system, a storage medium, and a computer program through an optional combination of the above components, it is effective as a kind of the present invention. Also, various components of the present invention are not always necessary to be independent components, and a plurality of components may be formed as one component, a component may be formed of a plurality of members, a component my be formed as a part of another component, and a part of a component may be shared by two or more components. Moreover, the data processing method of the present invention and the plurality of steps of the computer program are must not be executed at different differing timings. Therefore, one step may be executed during execution of another step, and execution of one step and execution of another step may partially or wholly overlap.

[0059]

As examples of the information management apparatus 100, 200, 300 of the present invention, a case where action data of a person is managed as the confidential data and the action data is supplied to the service providing unit 10 will be described.

Example 1

The information management apparatus 100 of the first exemplary embodiment in FIG. 1 will be described, by using it as an example. The confidential data storing section 101 stores action data showing an action of a person as data related to an individual ID. Especially, in this example, the confidential data storing section 101 stores the individual ID and data of a movement from a position to another position as action data (confidential data). More specifically, the confidential data storing section 101 stores position data which is shown by the latitude and the longitude which are measured by GPS and area data which is measured by using a base station for a mobile phone and so on and a digraph which contains an arrow showing a movement from a position to another position as the movement data. Moreover, the confidential data storing section 101 may relates a time and a time zone which a person stayed in a position, contents of purchase and amusement at the position to store them.

Figure 8:
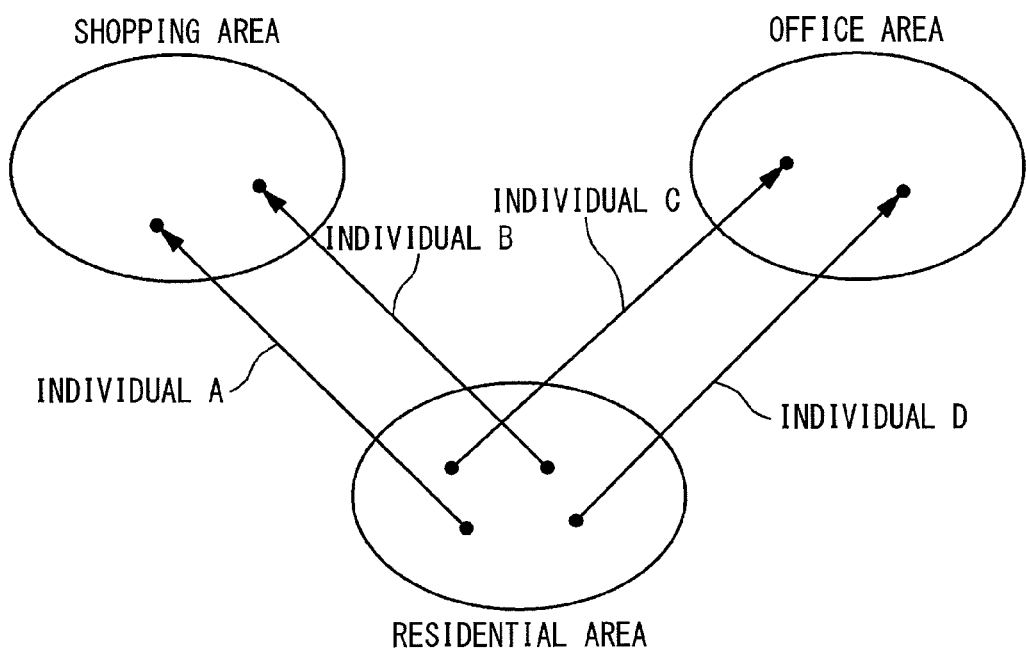
FIG. 8 is a diagram showing action data stored in a confidential data record section 101.

FIG. 8 is a diagram showing the movement data stored in the confidential data record section 101. Referring to FIG. 8, the confidential data storing section 101 relates and stores "individual A", "individual B", "individual C", and "individual D" and the movement data of the individual ID as the action data. The action data which is related to each of the "individual A" and the "individual B" shows the movement from a position in a residential area to a position in is a shopping area. The action data which is related to each of the "individual C" and the "individual D" shows the movement from a position in the residential area to a position in an office town.

Figure 9:
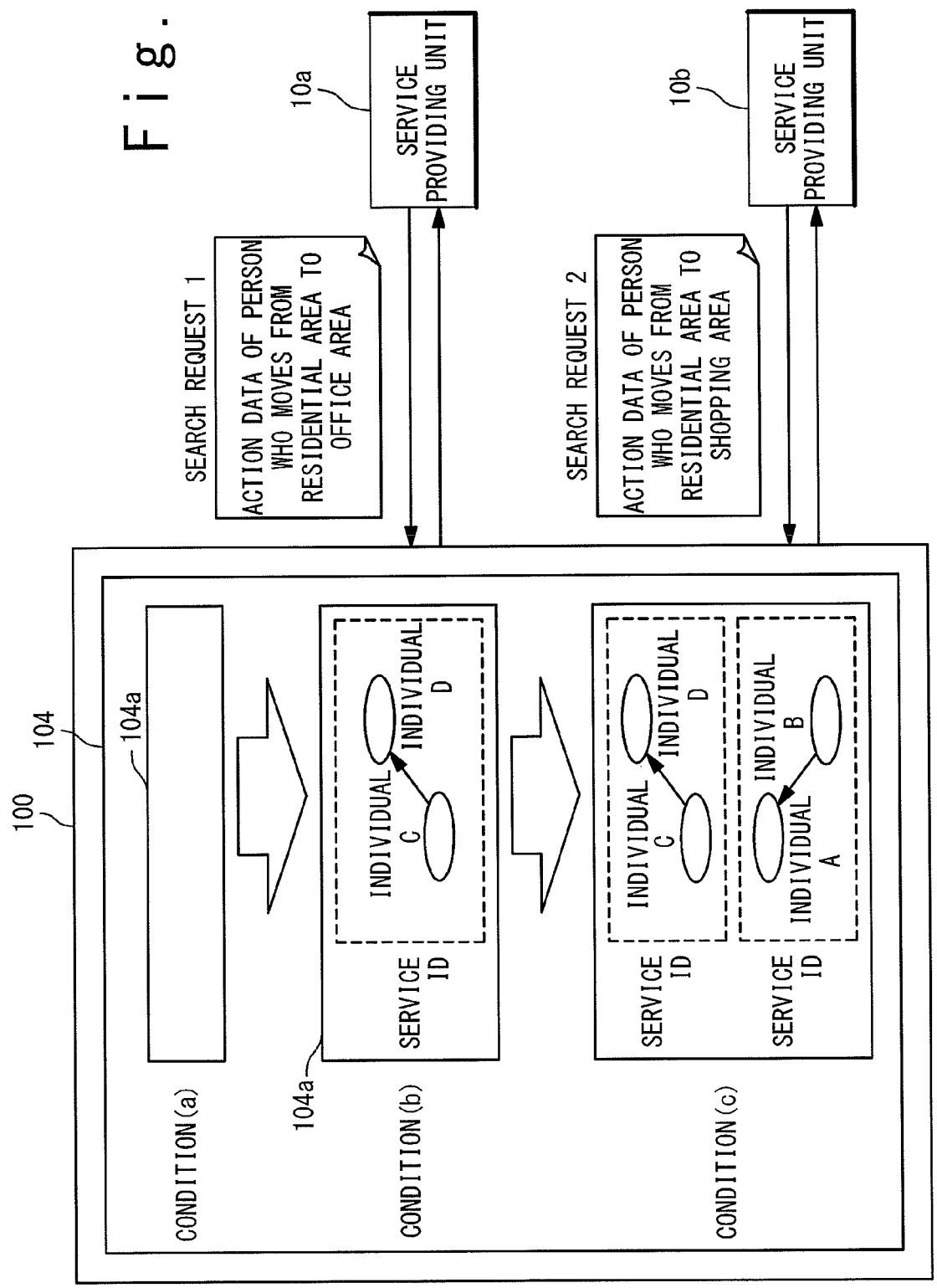
FIG. 9 is a diagram showing a condition of a transmission record 104a stored in the transmission record storing section 104.

FIG. 9 is a diagram showing the condition of a transmission record 104a stored in the transmission record storing section 104. Referring to FIG. 9, in an initial condition (a), the transmission record 104a is empty. It should be noted that when the record is processed to contain two or more action data (when there are two or more persons who take a same action), the anonymizing section 105 determines anonymity to have been satisfied.

Hereinafter, it will be described with reference to a flow chart of FIG. 3. The receiving section 102 receives the search request 1 shown in FIG. 9 from the service providing unit 10a (the step S01 of FIG. 3). The search request 1 contains the "action data of a person who moves from a residential area to an office area" in the search condition and "http://service1.com" of the service ID used to identify the service providing unit 10a. The receiving section 102 supplies the received search request to the searching section 103.

The searching section 103 extracts "the action data of the person who moves from the residential area to the office area" in the search condition from the received search request. The searching section 103 extracts the plurality of candidate data which match to the search condition, from among the confidential data which are stored in the confidential data storing section 101. In other words, the searching section 103 extracts the action data which is related to "individual C" and "individual C" of the individual ID, and the action data which is related to "individual D" and "individual D" of the individual ID. The searching section 103 supplies the plurality of candidate data and the service ID which is contained in the search request, to the anonymizing section 105 (the step S02 of FIG. 3).

The anonymizing section 105 receives the plurality of candidate data and the service ID from the searching section 103. The anonymizing section 105 anonymizes the plurality of candidate data by using the transmission record 104a. In the condition (a), because the transmission data has not been stored in the transmission record 104a, the anonymizing section 105 generates new transmission data by carrying out processing to contain two action data by using the plurality of candidate data. In other words, the anonymizing section 105 coverts (anonymizes) the position data in the residential area and the office area into the position data having an area extent to contain the two position data by using two movement data which are related to "individual C" and "individual D". The anonymizing section 105 supplies the new transmission data to the managing section 106 together with the service ID (the step S03 of FIG. 3).

The managing section 106 receives the service ID and the new transmission data from the anonymizing section 105. The managing section 106 supplies the new transmission data which is transmitted to the service providing unit 10a, to the transmission record storing section 104 together with the service ID. Moreover, the managing section 106 supplies the service ID and the new transmission data to the transmitting section 107. The transmission record storing section 104 relates the new transmission data to the service ID and stores them in the transmission record 104a. The transmission record 104a changes to a condition (b) shown in FIG. 9 (the step S04 of FIG. 3).

The transmitting section 107 receives the service ID and the new transmission data. The transmitting section 107 transmits the new transmission data to the service providing unit 10a based on "http://service1.com" of the service ID (the step S05 of FIG. 3).

The information management apparatus 100 carries out the processing on the service providing unit 10b in the same way. In detail, the searching section 103 extracts "the action data of a person who moves from a residential area to a busy shopping area" in the search condition from the received search request 2. The searching section 103 extracts as the plurality of candidate data, the action data corresponding to the individual ID of "individual A" and the movement data which is related to the "individual A", and the action data corresponding to the individual ID of "individual B" and the movement data which is related to the "individual B", which match to the search condition. The anonymizing section 105 anonymizes the plurality of candidate data by using the transmission record 104a. In a condition (b), because the transmission data which is related to the service ID of the service providing unit 10b, has not been stored in the transmission record 104a, the anonymizing section 105 generates the new transmission data by carrying out processing to contain two action data by using the plurality of candidate data. The anonymizing section 105 supplies the plurality of anonymized candidate data together with the service ID to the managing section 106 as the new transmission data. After that, the transmission record storing section 104 relates the new transmission data to the service ID and stores them in the transmission record 104a. The transmission record 104a changes to a condition (c) shown in FIG. 9. It should be noted that in the condition (c) of FIG. 9, the upper stage is for the service providing unit 10a and the lower stage is for the service providing unit 10b.

Figure 10:
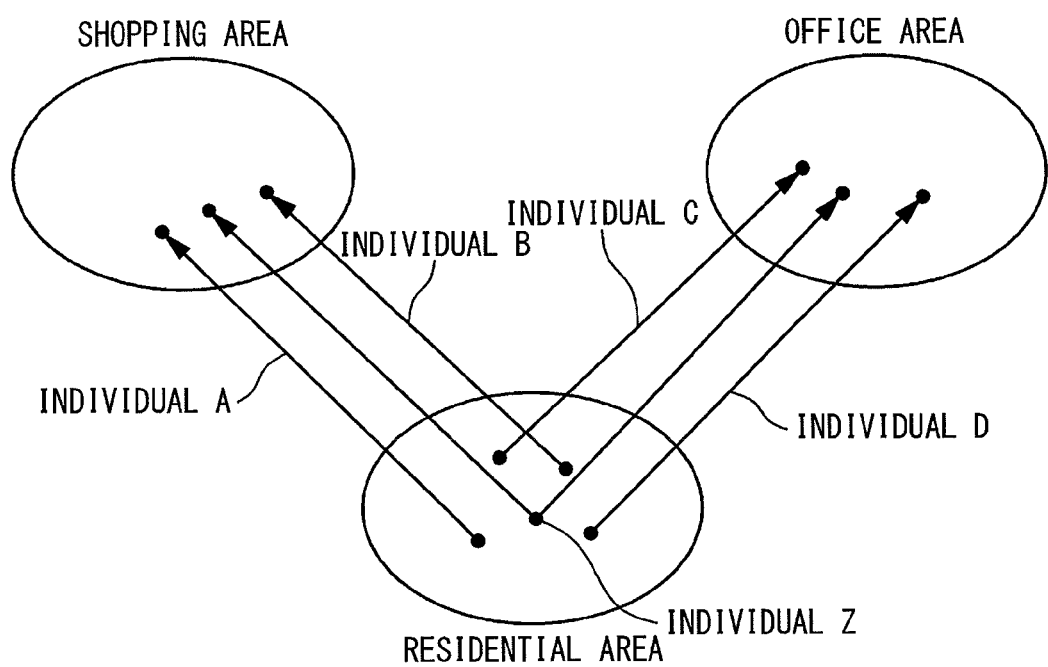
FIG. 10 is a diagram when action data of a person (having the individual ID of "individual Z") who moves from a residential area to both of an office area and a shopping area is added to FIG. 8.

Next, it is supposed that the action data of a person (having the individual ID of "individual Z") who moves from the residential area to both of the office area and the shopping area is registered on the confidential data storing section 101. In FIG. 10, the action data of a person (having the individual ID is "individual Z") which moves from the residential area to both of the office area and the shopping area is added to FIG. 8. Here, it is supposed that the service providing unit 10a transmits the search request which contains a conditional expression (equation) for searching the action data added after the last search to the information management apparatus 100 with respect to the action data of a person who moves from the residential area to the office area. In other words, the search condition in this case is for searching the data which is added after the search executed in response to the last search request, and is the same type as the last search request. The receiving section 102 receives the search request (the step S01 of FIG. 3).

The searching section 103 extracts as the candidate data, "individual Z" as the individual ID which matches to the search condition and the action data related to "individual Z" and movement from the residential area to the office area. The searching section 103 supplies the candidate data and the service ID which is contained in the search request to the anonymizing section 105 (the step S02 of FIG. 3).

Figure 11:
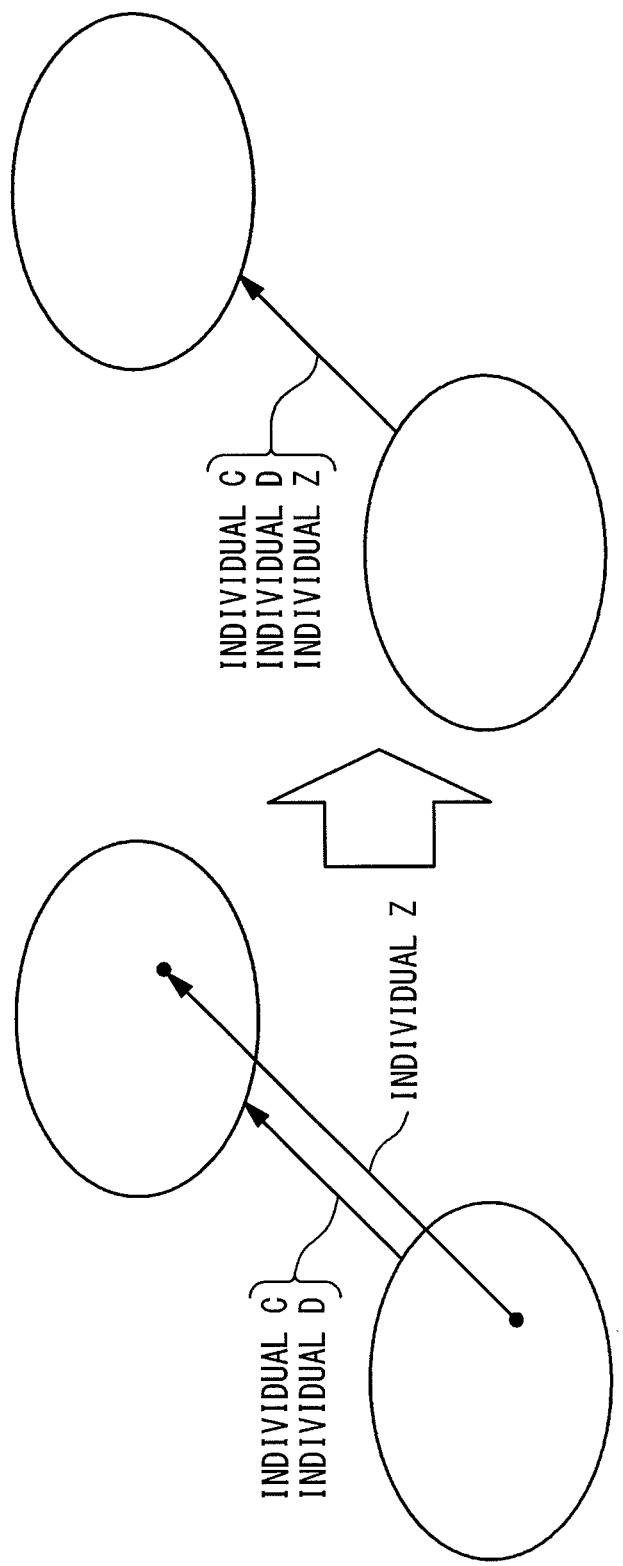
FIG. 11 is a diagram showing a manner when an anonymizing section 105 converts position data in the residential area and the office area with respect to the individual ID of "individual Z" into position data for a same area as anonymized "individual C" and "individual D"

The anonymizing section 105 receives the candidate data and the service ID from the searching section 103. The anonymizing section 105 anonymizes the candidate data by using the transmission record (the step S03 of FIG. 3). In detail, the anonymizing section 105 refers to the transmission record 104a in the transmission record storing section 104 and extracts the transmission data which is related to the same service ID as the service ID of the service providing unit 10a. Next, the anonymizing section 105 merges the candidate data and the extracted transmission data and generates temporary transmission data. The anonymizing section 105 carries out processing (anonymization) such as abstraction, obscuring, and partial deletion to the candidate data by using the transmission data, such that the temporary transmission data satisfies the anonymity. In other words, the anonymizing section 105 carries out the processing to contain the movement data of "individual Z" from the residential area to the office area and the movement data of anonymized "individual C" and "individual D" from the residential area to the office area. FIG. 11 is a diagram showing a manner when the anonymizing section 105 converts the position data corresponding to the individual ID of "individual Z" in the residential area and the office area into the position data corresponding to the same area as in the anonymized "individual C" and "individual D". The anonymizing section 105 supplies the new transmission data to the managing section 106 together with the service ID.

The managing section 106 receives the service ID of the service providing unit 10a and the new transmission data from the anonymizing section 105. The managing section 106 supplies the new transmission data which is transmitted to the service providing unit 10a to the transmission record storing section 104 together with the service ID. Moreover, the managing section 106 supplies the service ID and the new transmission data to the transmitting section 107. The transmission record storing section 104 relates the new transmission data to the service ID and stores them in the transmission record (the step S04 of FIG. 3). The transmitting section 107 receives the service ID and the new transmission data. The transmitting section 107 transmits the new transmission data to the service providing units 10 based on the service ID (the step S05 of FIG. 3).

Example 2

Next, as an example of the information management apparatus 200 in the second exemplary embodiment of the present invention, a case that converts an individual ID into an ID which is peculiar to the service providing unit 10 as a request source will be described. In this example, the confidential data storing section 101 of the information management apparatus 200 relates and stores "individual A", "individual B", "individual C", and "individual D" of the individual IDs and the action data, like the action data of FIG. 8.

The ID correspondence storing section 110 relates and stores a plurality of individual IDs and the plurality of service individual IDs which are different every service providing unit 10. FIG. 12 is a table showing the individual IDs stored in the ID correspondence storing section 110 and the service individual IDs corresponding to the individual IDs. Referring to FIG. 12, the service individual ID of "individual α" is set to the service providing unit 10a and the service individual ID of "individual 1" is set to the service providing unit 10b, with respect to the individual ID of "individual A". This is similar with respect to "Individual B", "Individual C", and "individual D".

Hereinafter, the operation will be described with reference to a flow chart of FIG. 5. The receiving section 102 receives the search request 1 shown in FIG. 9 from the service providing unit 10a (the step S10 of FIG. 5). The search request 1 contains "the action data of a person who moves from the residential area to the office area" in the search condition, and "http://service1.com" as the service ID which identifies the service providing unit 10a. The receiving section 102 supplies the received search request to the searching section 103.

The searching section 103 extracts "the action data of the person who moves from the residential area to the office area" in the search condition from the received search request. The searching section 103 extracts "individual C" as the individual ID which matches to the search condition and the action data which is related to "individual C", and "individual D" as the individual ID and the action data which are related to "individual D" as the plurality of candidate data, from the confidential data which are stored in the confidential data storing section 101. The searching section 103 supplies the plurality of candidate data and the service ID which is contained in the search request, to the ID converting section 111 (the step S11 of FIG. 5).

The ID converting section 111 receives the plurality of candidate data and the service ID from the searching section 103. The ID converting section 111 reads the "individual C" and the "individual D" as the individual IDs which are contained in the plurality of candidate data. The ID converting section 111 pays attention on the "individual C" and the "individual D" which are related to the service providing unit 10a, and extracts "individual y" corresponding to "individual C" and "individual δ" corresponding to "individual D" from the ID correspondence storing section 110. The ID converting section 111 replaces the individual ID which is contained in each of the plurality of candidate data with the extracted service individual ID (the step S12 of FIG. 5). The ID converting section 111 supplies the service individual IDs and the plurality of candidate data which contain the service individual IDs to the anonymizing section 105. Because the subsequent steps S13 to S15 of FIG. 5 are same as the operation of the example 1, the description is omitted.

Example 3

Figure 13:
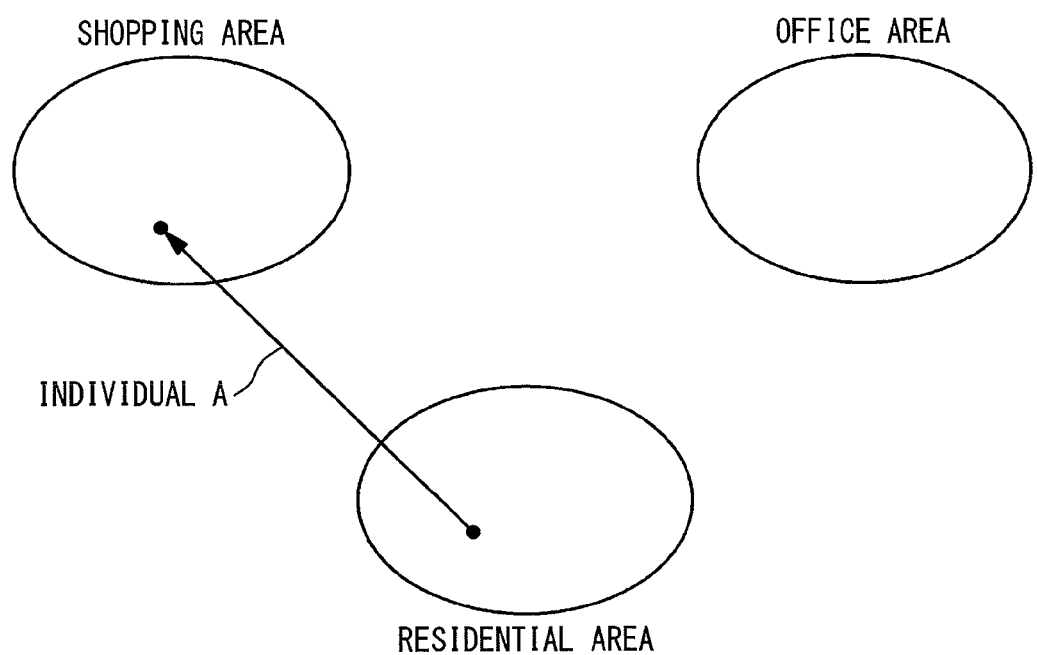
FIG. 13 is a diagram showing the action data which is of a person having the individual ID of "individual A" and which is stored in the confidential data storing section 101.

Next, as an example of the information management apparatus 300 in the third exemplary embodiment of the present invention, an example that the data not transmitted to the service providing unit 10 because it did not satisfy the anonymity is used for the anonymity of the subsequent search request will be described. In this example, it is supposed that the confidential data storing section 101 stores the action data of a person having the individual ID of "individual A" in the initial state. FIG. 13 is a diagram showing the action data of the person having the individual ID of the "individual A" stored in the confidential data storing section 101. Referring to FIG. 13, the action data which is related to the "individual A" as the individual ID shows movement from the residential area to the shopping area. It should be noted that it is supposed that the transmission record in the transmission record storing section 104 and the un-transmitted record in the un-transmitted record storing section 120 are empty in the initial state.

It is supposed that the service providing unit 10 has transmitted the search request which contains the search condition to acquire the action data of the person who moves from the residential area to the shopping area, to the information management apparatus 300. The receiving section 102 of the information management apparatus 300 receives the search request (the step S30 of FIG. 7).

The searching section 103 extracts as the candidate data, the "individual A" as the individual ID which matches to the search condition and the action data related to the "individual A" for movement from the residential area to the shopping area (the step S31 of FIG. 7). The searching section 103 supplies the candidate data and the service ID which is contained in the search request to the second anonymizing section 121.

The second anonymizing section 121 receives the candidate data and the service ID from the searching section 103. Here, because the transmission record and the un-transmitted record are empty, the second anonymizing section 121 sets the candidate data (the action data of a person having "individual A" as the individual ID) as new un-transmitted data (the step S32 of FIG. 7). The second anonymizing section 121 supplies the new un-transmitted data to the second managing section 122 together with the service ID. The un-transmitted record storing section 120 stores the un-transmitted data (the step S34 of FIG. 7).

Figure 14:
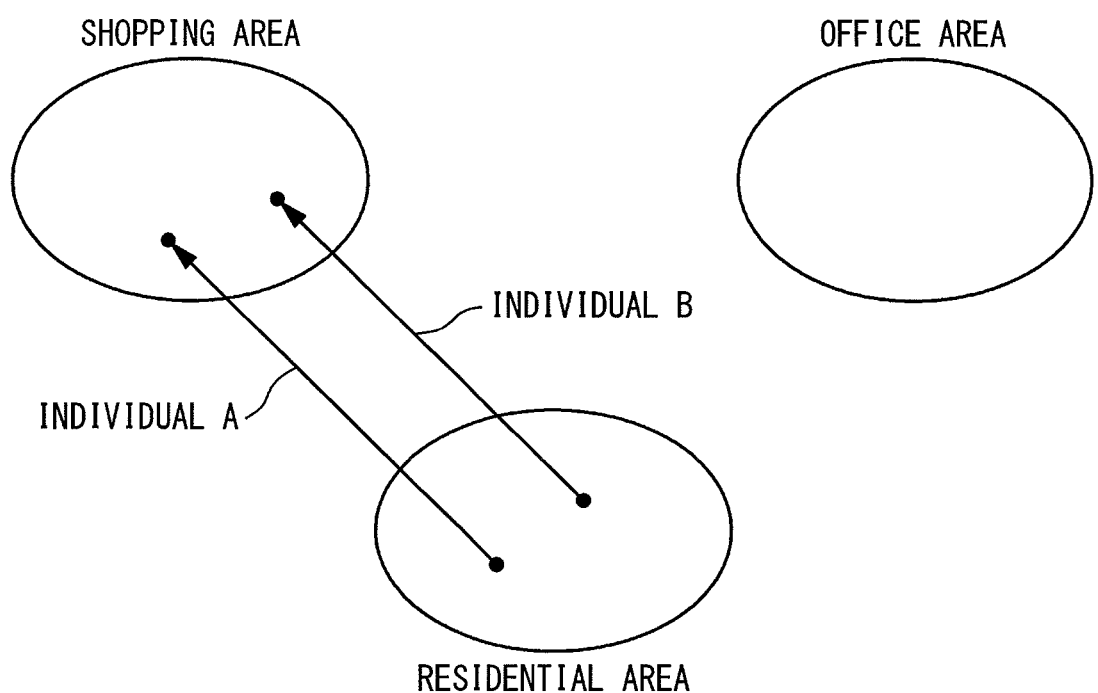
FIG. 14 is a diagram when the action data of a person having the individual ID of "individual B" and moving from the residential area to the shopping area is added to FIG. 13.

Next, it is supposed that the action data of the person having "individual B" as the individual ID and moving from the residential area to the shopping area is registered in the confidential data storing section 101. FIG. 14 is a diagram when the action data of the person having "individual B" as the individual ID and moving from the residential area to the shopping area is added to FIG. 13. Here, it is supposed that the service providing unit 10 has transmitted the search request which contains a conditional expression for searching the action data which is added after the last search, to the information management apparatus 300, with respect to the action data of the person who moves from the residential area to the shopping area. In other words, the search condition in this example is a search of data added after the search based on the last search request, and having a same kind as the last search request (the data of the same kind as the data which cannot be anonymized). The receiving section 102 receives the search request (the step S30 of FIG. 7). The searching section 103 extracts as the candidate data, "individual B" as the individual ID which matches to the search condition and the action data which is related to the "individual B" from the confidential data stored in the confidential data storing section 101 (Step S31 of FIG. 7). The searching section 103 supplies the candidate data and the service ID which is contained in the search request, to the second anonymizing section 121.

The second anonymizing section 121 receives the candidate data and the service ID from the searching section 103. The second anonymizing section 121 refers to the un-transmitted record (sets of the service ID and the un-transmitted data) in the un-transmitted record storing section 120, and extracts the un-transmitted data which is related to the same service ID as the service ID of the service providing unit 10. The second anonymizing section 121 merges the candidate data and the extracted un-transmitted data and generates temporary transmission data. The second anonymizing section 121 carries out processing (anonymizing) such as abstraction, obscuring, and partial deletion to the candidate data by using the un-transmitted data, such that the temporary transmission data satisfies the anonymity. In other words, the second anonymizing section 121 carries out the processing to contain the candidate data (the action data of the person having the "individual B as "the individual ID) and the un-transmitted data (the action data of a person having the "individual A" as the individual ID). At this time, the second anonymizing section 121 determines data of a kind which is not contained in the data which is related to the individual ID of the "individual A, among the plurality of data which is related to the individual ID of the "individual B", to be the un-transmitted data which cannot be anonymized. The second anonymizing section 121 set the anonymized temporary transmission data as new transmission data and separates the data which cannot be anonymized, as new un-transmitted data. The second anonymizing section 121 supplies the anonymized temporary transmission data to the second managing section 122 together with the service ID as the new transmission data and supplies the data which cannot be anonymized, to the second managing section 122 together with the service ID as the new un-transmitted data (the step S32 of FIG. 7).

The second managing section 122 receives the service ID, the new transmission data and the new un-transmitted data from the second anonymizing section 121. The second managing section 122 supplies the service ID and the new transmission data to the transmission record storing section 104, and supplies the service ID and the new un-transmitted data to the un-transmitted record storing section 120. Moreover, the second managing section 122 supplies the service ID and the new transmission data to the transmitting section 107. The transmission record storing section 104 relates the new transmission data to the service ID and stores them in the transmission record (the step S33 of FIG. 7). Also, the un-transmitted record storing section 120 relates the new un-transmitted data to the service ID and stores them in the un-transmitted record (the step S34 of FIG. 7). The transmitting section 107 receives the service ID and the new transmission data from the managing section 106. The transmitting section 107 transmits the new transmission data to the service providing units 10 based on the service ID (the step S35 of FIG. 7).

In the above, by referring to the above embodiments (and examples), the present invention has been described. However, the present invention is not limited to the above embodiments (and examples). Various changes that the skilled person in the art can understand in the scope of the present invention can be carried out to the configuration and the details of the present invention.

This patent application claims a priority on convention based on Japan Patent Application No. 2009-180041 filed on Jul. 31, 2009 and the disclosure thereof is incorporated herein by reference.

The invention claimed is:

1. An information management apparatus comprising:
a confidential data storing section configured to store as confidential data, a plurality of individual identifiers (IDs) and data which is related to each of the plurality of individual IDs, wherein the data which is related to each of the plurality of individual IDs comprises action data including movement information associated with each of the plurality of individual IDs;
a receiving section configured to receive a first search condition used to acquire desired confidential data, wherein the first search condition includes action data and is transmitted from a first service providing unit;
a searching section which is executed by a processor, configured to extract first candidate data which matches to the first search condition, from said confidential data storing memory;
a transmission record storing section configured to store a plurality of anonymized data which have previously been transmitted to said first service providing unit;
an anonymizing section configured to generate first transmission data by carrying out processing to contain the first candidate data and first data of the plurality of anonymized data based on the first data having data of a same kind as the first candidate data; and
a transmitting section configured to transmit the first transmission data to said first service providing unit;
an ID correspondence storing section configured to relate and store the plurality of individual IDs and a plurality of service individual IDs which are different every service providing unit; and
an ID converting section configured to receive the first candidate data and replace a first individual ID which is contained in the first candidate data, with a first service individual ID corresponding to the first individual ID,
wherein said transmitting section transmits the first transmission data which contains the first service individual ID, to said first service providing unit.

2. The information management apparatus according to claim 1, further comprising:
a managing section configured to receive the first transmission data to supply to said transmission record storing section,
wherein said transmission record storing section stores the first transmission data to be contained in the plurality of anonymized data.

3. The information management apparatus according to claim 1, further comprising:
an un-transmitted record storing section configured to store data which is contained in the first candidate data and which cannot be anonymized, as un-transmitted data,
wherein said anonymizing section determines data of a kind which is not contained in the first data, among data which are contained in the first candidate data, as data which cannot be anonymized.

4. The information management apparatus according to claim 3, wherein when said confidential data storing memory stores second data having data of a same kind as the data which cannot be anonymized, after the first candidate data matching the first search condition is extracted, and said receiving section receives a second search condition used to acquire data that has been added after a search based on the first search condition and being of a same kind as data which cannot be anonymized, from said first service providing unit;
said searching section extracts the second data matching the second search condition from said confidential data storage section, as second candidate data, and
said anonymizing section generates second transmission data by carrying out processing to contain the second candidate data and at least one of the un-transmitted data and third data having data of the same kind as the second candidate data, of the plurality of anonymized data, and
said transmitting section transmits the second transmission data to said first service providing unit.

5. An information management method executed by a computer, comprising:
receiving a first search condition used to acquire desired confidential data, wherein the first search condition includes action data and is transmitted from a first service providing unit;
extracting first candidate data which matches to the first search condition from a confidential data storing section which stores a plurality of individual Ds and data related to each of the plurality of individual IDs, as confidential data, wherein the data related to each of the plurality of individual IDs comprises movement information as action data;
generating first transmission data by carrying out processing to contain the first candidate data and first data, among a plurality of anonymized data which have previously been transmitted to said first service providing unit, based on the first data which has data of a same kind as the first candidate data; and
transmitting the first transmission data to said first service providing unit;
replacing a first individual ID which is contained in the first candidate data, with a first service individual ID corresponding to the first individual ID based on an ID correspondence storing section configured to relate and store the said plurality of individual IDs and a plurality of service individual IDs which are different every service providing unit,
wherein said generating the first transmission data comprises:
carrying out processing the first candidate data to contain the first candidate data containing the first service individual ID, and the first data.

6. The information management method according to claim 5, wherein said generating said first transmission data comprises:
determining data of a kind which is not contained in the first data, among data which is contained in the first candidate data, as data which cannot be anonymized; and
storing the data which cannot be anonymized said as un-transmitted data.

7. The information management method according to claim 6, further comprising:
storing as the confidential data, second data having data of a same kind as the data which cannot be anonymized, after the first candidate data matching the first search condition is extracted;
receiving a second search condition used to acquire data that is added after a search based on the first search condition and being of the same kind as data which cannot be anonymized, from said first service providing unit;

extracting the second data matching the second search condition from said confidential data storage section as second candidate data; and generating second transmission data by carrying out processing to contain the second candidate data and at least one of the un-transmitted data and third data having data of the same kind as the second candidate data, of the plurality of anonymized data; and transmitting the second transmission data to said first service providing unit.

8. A non-transitory computer-readable recording medium in which a computer-executable information management program code is stored to be attained an information management method, which comprises:

receiving a first search condition used to acquire desired confidential data, wherein the first search condition includes action data and is transmitted from a first service providing unit;

extracting as confidential data, first candidate data which matches to the first search condition from a confidential data storing section which stores a plurality of individual IDs and data related to each of the plurality of individual IDs, wherein the data related to each of the plurality of individual IDs comprises movement information as action data;

generating first transmission data by carrying out processing to contain the first candidate data and first data, among a plurality of anonymized data which have previously been transmitted to said first service providing unit, based on the first data which has data of a same kind as the first candidate data:

transmitting the first transmission data said first service providing unit; and replacing a first individual ID which is contained in the first candidate data, with a first service individual ID corresponding to the first individual ID based on an ID correspondence storing section configured to relate and store the said plurality of individual IDs and a plurality of service individual IDs which are different every service providing unit, wherein said generating the first transmission data comprises:

carrying out processing the first candidate data to contain the first candidate data containing the first service individual ID and the first data.

9. The non-transitory computer-readable recording medium according to claim 8, wherein said generating said first transmission data comprises:

determining data of a kind which is not contained in the first data, among data which is contained in the first candidate data, as data which cannot be anonymized; and storing the data which cannot be anonymized said as un-transmitted data.

10. The non-transitory computer-readable recording medium according to claim 9, wherein said information management method further comprises:

storing as the confidential data, second data which has data of a same kind as the data which cannot be anonymized, after the first candidate data which matches to the first search condition is extracted;

receiving a second search condition used to acquire data which is added after the search based on the first search condition and which is of the same kind as data which cannot be anonymized, from said first service providing unit;

extracting the second data which matches to the second search condition from said confidential data storage section as second candidate data; and generating second transmission data by carrying out processing to contain the second candidate data and at least one of the un-transmitted data and third data which has data of the same kind as the second candidate data, of the plurality of anonymized.

* * * * *

UNITED STATES PATENT AND TRADEMARK OFFICE
CERTIFICATE OF CORRECTION

| | | |
|---|---|---|
| PATENT NO. | : 8,938,433 B2 | Page 1 of 1 |
| APPLICATION NO. | : 13/387890 | |
| DATED | : January 20, 2015 | |
| INVENTOR(S) | : Shinya Miyakawa | |

It is certified that error appears in the above-identified patent and that said Letters Patent is hereby corrected as shown below:

ON THE TITLE PAGE

Page 2, Column 1, Line 4: Delete "355" and insert -- 335 --

IN THE SPECIFICATION

Column 16, Line 59: Delete "y"" and insert -- Y" --

IN THE CLAIMS

Column 20, Line 22: In Claim 5, delete "Ds" and insert -- IDs --

Column 21, Line 33: In Claim 8, after "data" insert -- to --

Column 22, Line 37: In Claim 10, delete "anonymized." and insert -- anonymized data; and transmitting the second transmission data to said first service providing unit. --

Signed and Sealed this
Twenty-ninth Day of December, 2015

Michelle K. Lee
*Director of the United States Patent and Trademark Office*